United States Patent [19]

Mourad

[11] Patent Number: 5,590,381
[45] Date of Patent: Dec. 31, 1996

[54] METHOD AND APPARATUS FOR BUFFERED VIDEO PLAYBACK OF VIDEO CONTENT DISTRIBUTED ON A PLURALITY OF DISKS

[75] Inventor: Antoine N. Mourad, Aberdeen, N.J.

[73] Assignee: Lucent Technologies Inc., Murray Hill, N.J.

[21] Appl. No.: 268,599

[22] Filed: Jun. 30, 1994

[51] Int. Cl.⁶ .......................... G06F 13/00; G06F 11/00; G06F 12/00

[52] U.S. Cl. .................. 395/872; 395/182.03; 395/441; 364/DIG. 1; 364/266.3; 364/945.6; 364/285; 345/201

[58] Field of Search .......................... 364/200 MS File, 364/900 MS File; 395/200, 427, 821, 182.03, 872, 441; 345/201, 185

[56] References Cited

U.S. PATENT DOCUMENTS

| | | | |
|---|---|---|---|
| 4,958,236 | 9/1990 | Nagashima et al. | 358/445 |
| 5,086,439 | 2/1992 | Asai et al. | 375/241 |
| 5,150,472 | 9/1992 | Blank et al. | 395/425 |
| 5,163,131 | 11/1992 | Row et al. | 395/200 |
| 5,237,658 | 8/1993 | Walker et al. | 395/200 |
| 5,261,053 | 11/1993 | Valencia | 395/200 |
| 5,303,244 | 4/1994 | Watson | 371/10.1 |
| 5,311,324 | 5/1994 | Temma et al. | 358/342 |
| 5,379,417 | 1/1995 | Lui et al. | 395/575 |
| 5,418,910 | 5/1995 | Siegel | 395/275 |

OTHER PUBLICATIONS

Gold Disk boosts its AWI, opens drivers to developers, Computer Pictures, vol. 10, No. 4, p. 12(2) Jul. 1992.

Mourad et al., Recovery Issues in Databases Using Redundant Disk Arrays, Journal of Parallel and Distributed Computing, vol. 17, Nos. 1 and 2, pp. 75–89 Jan. 1993.

Primary Examiner—Matthew M. Kim

[57] ABSTRACT

Playback of video content distributed on disks in successive data blocks for a plurality of viewers, involves accessing data for each viewer from a different one of the blocks on the disks within a time cycle, placing the accessed data from each block in respective buffers, reading out the data in the buffers sequentially in common cycles, and reading out the cycles. Preferably the content is in successive blocks over the discs on a round robin basis, and accessing includes accessing different blocks on the same disk within the time cycle.

18 Claims, 9 Drawing Sheets

METHOD AND APPARATUS FOR BUFFERED VIDEO PLAYBACK OF VIDEO CONTENT DISTRIBUTED ON A PLURALITY OF DISKS

FIELD OF THE INVENTION

This invention relates to on-demand video devices and methods, and particularly to such methods and means for allowing a user to access one copy of a video performance, on demand, at one point such as the start of a performance while others are viewing the same copy at other points.

BACKGROUND OF THE INVENTION

Attempts have been made to allow multiple users to access a given copy of a video performance at different times in different parts of the performance. However, these and other endeavors have resulted in costly cumbersome systems.

SUMMARY OF THE INVENTION

The invention involves distributing a single video performance on a plurality of disks in successive stripes, accessing data on a plurality of the stripes on the disks simultaneously, reading the data into buffers, and reading out the data in the buffers sequentially in common cycles.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
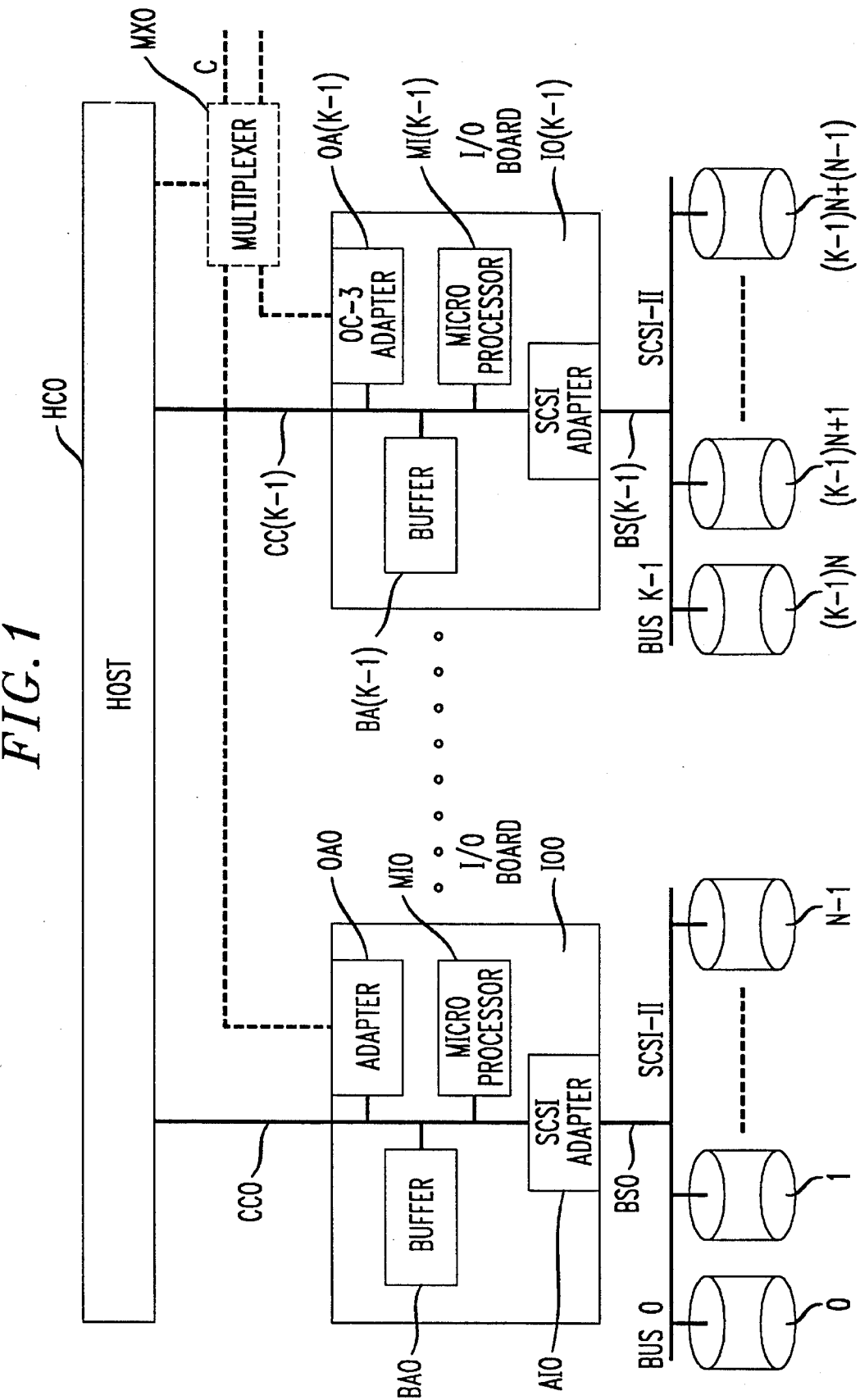
FIG. 1 is a block diagram showing the architecture of a system embodying features of the invention.

FIG. 1 illustrates the architecture of a system embodying the invention. Here, a host computer HC0 receives requests from users to play a video performance (such as a movie), to stop the performance, to restart the performance, etc. Control channels CC0 to CC(K–1) communicate computer commands from and to respective I/O boards IO0 to IO(K–1). In the boards IO0 to IO(K+1) respective microprocessors MI0 to MI(K–1) control buffer arrays BA0 to BA(K–1), optical channel interface adapters OA0 to OA(K–1), and SCSI (small computer system interface) adapters IA0 to IA(K–1). SCSI-II buses BS0 to BS(K–1) connect respective adapters IA0 to IA(K–1) to K sets of disks 0, 1, ... (N–1), N, N+1, ... (2N–1), ... (k–1)N, (K–1)N+1, ... (K–1)N+ N–1. The bus BS0 connects to the disks 0 to (N–1). A bus BS1 not shown connects to the disks N to (2N–1). The bus BS(K–1) connects to the disks (K–1)N to (K–1)N+N– 1. Thus, there are KN disks 0 to (K–1)N+N–1. Optical fibers or channels CC0 to CC(K–1) connect the optical channel interface adapters OA0 to OA(k–1) to a multiplexer MX0. According to another embodiment of an asynchronous transfer mode switch is used in place of the multiplexer MX0.

Figure 2:
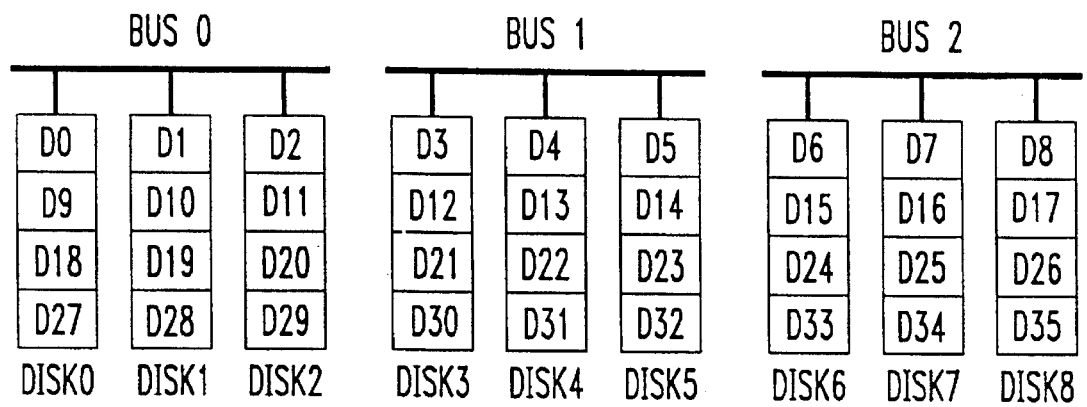
FIG. 2 is a diagram showing the striping of disks according to an aspect of the invention

In FIG. 1, the content of a given video performance is divided into consecutive data blocks D0 to Da (a for example=10,000) of fixed size U which are spread, or striped, over all the disks 0 to (K–1)N+N–1 in round-robin order as shown in FIG. 2. Here K=3 and N=3. Specifically, the data blocks D0 to Da are striped across the disks 0 to (K–1)(N–1) within the same bus and across the busses BS0 to BS(K–1). The microprocessors access the data in the disks in time cycles. The data for several performances is striped over all the disks or any subset of the disks.

The buffer arrays BA0 to BA(K–1) contain buffer pairs. Each buffer in a pair loads data in while the other reads data out.

In the blocks of FIG. 2 the data streams run horizontally, e.g. D0 to D8, D9 to D17, D18 to D26, and D27 to D35. This is only an example. The data streams need not start at the first disk or on the same disk. Accessing of active blocks of one disk occurs in a cycle for all concurrent users of that disk before initiating accessing on the next disk for those users.

In the example of the use of the disks in FIG. 2, it is assumed that one user is accessing a performance along a first stream composed sequentially of data blocks D0, D2, D3, ... D8, and simultaneously another user is accessing the performance along a second data stream composed sequentially of blocks D18, D19, D20, ... D26. A third user is accessing D29 etc. This can occur, for example if the second user started accessing the performance at an earlier time and has already passed through the sequence of blocks D0 to D17 and the third user has already passed through the sequence D0 to D28. In operation, the microprocessor MI0 sends a command to transfer the data of each of the active blocks on the first disk 0 and the third disk 2 to respective ones of the buffer pairs. One half of each of two buffer pairs then holds the data of one block on the same disk. The time allocated to access the blocks and transfer the data from one disk in this manner is defined as one cycle.

At the close of the first cycle, and the start of the second cycle, the data in the buffer pairs is read out to the viewers via the multiplexer MX0. Simultaneously with the start of the second cycle, the microprocessors MI0 and MI1 command the disks to transfer data in the next blocks D1, D19, and D30 of the next disks 1 and 3 in the data streams composed of D0 to D8 and D18 to D26 and D29, etc., on into the second halves of the same buffer pairs for the bus BS0. For the third user, the microprocessor MI1 transfers the data into a buffer pair of the buffer array BA1. This completes a second cycle. Subsequent cycles involve reading out blocks D2, D20, and D31 into the corresponding buffer pairs while transferring the data of blocks D1 D19, and D30 out. This continues in cycles that read out of the same buffer pairs the data of blocks D2, D20, and D31 and while reading in the data from blocks D3, D21, and D32, reading out the data of blocks D3, D21, and D32 while reading in the data from blocks D4, D22, and D33, reading out the data of blocks D4, D22, and D33, etc.

The invention finishes access for one viewer from one disk before starting access for the same viewer on the next disc. This allows use of only one buffer pair for each user. When a user moves from bus to bus the user relinquishes use of the buffer pair in the first bus when acquiring a buffer pair in the next bus. It also allows for more than one access for different viewers to the same disk or to multiple disks on the same bus. There is no need for service from the disks or bus in order of demand. This permits efficiency and allows for more than one disk on one bus.

Figure 3:
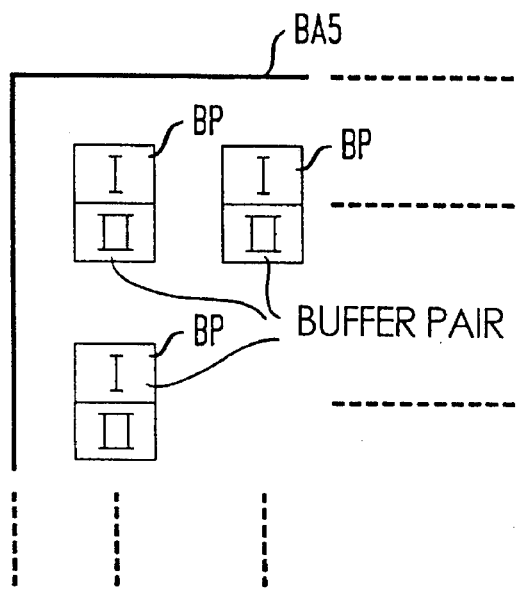
FIG. 3 is a block diagram of the details of a buffer array in FIG. 1.

FIG. 3 illustrates details of one of each of the buffer arrays BA0 to BA(K−1), for example BA5. Here, buffer pairs BP serve all the concurrent users of the bus at that time. Each buffer pair includes a buffer I and a buffer II. Under control of the respective microprocessors MI0 to MI(K−1), the buffers I and II in the pair alternate in operation. One buffer takes in data from a disk through any one SCSI adapter IA0 to IA(K−1), for example IA5, while the other buffer outputs data stored therein to an optical fiber OF through respective optical channel interface adapters OA0 to OA(K−1), for example OA5. The buffers then reverse their roles. After receiving service from the disks attached to one bus, e.g. bus 5, the user is serviced by the disks on the next bus, e.g. bus 6, at which time the buffer pair reserved for that user in the buffer array, e.g. buffer BA5, is allocated to another user. At any time a user needs only one pair of buffers.

When a user requests a performance, the microprocessor MI0 starts by accessing the first block D0, storing it in the buffer array BA0 until the beginning of the next cycle. It then passes the performance data out of the buffer array via the adapter OA0 onto and the optical channel CC0 to the multiplexer MX0. In succeeding cycles the microprocessors MI0 to MI(K−1) then access groups of successive blocks, store the accessed data blocks in the buffer arrays BA0, BA1, BA2, etc, and passes the data blocks out of the buffer arrays onto the optical channels CC0, CC1, etc. The multiplexer MX0 multiplexes the outputs of different busses BS0 to BS(K−1) for consecutive viewing by the user.

Each block is referred to as a striping for unit and, represents an I/O transfer whose size is U measured in bytes. Cycles are arranged to be long enough to accept the number of data transfers and latency time to access a block for each user in a batch of users for any one disk. The cycle time is sufficiently long to accept, for example, six I/O accesses, i.e., data block transfers for 6 blocks and their associated latency time. The corresponding I/O transfers in successive cycles represent a video stream.

If the maximal number of I/O transfers or data streams that can be supported from one disk is n, then up to nd video streams can be supported from a group of d disks for example d=NK all the disks. The size of all I/O transfers is set to U. The operation of the disks is on a time slice basis. The time slice or cycle is equal to the playback time of the block of size U which is U/R, where R is the playback rate.

Figure 4:
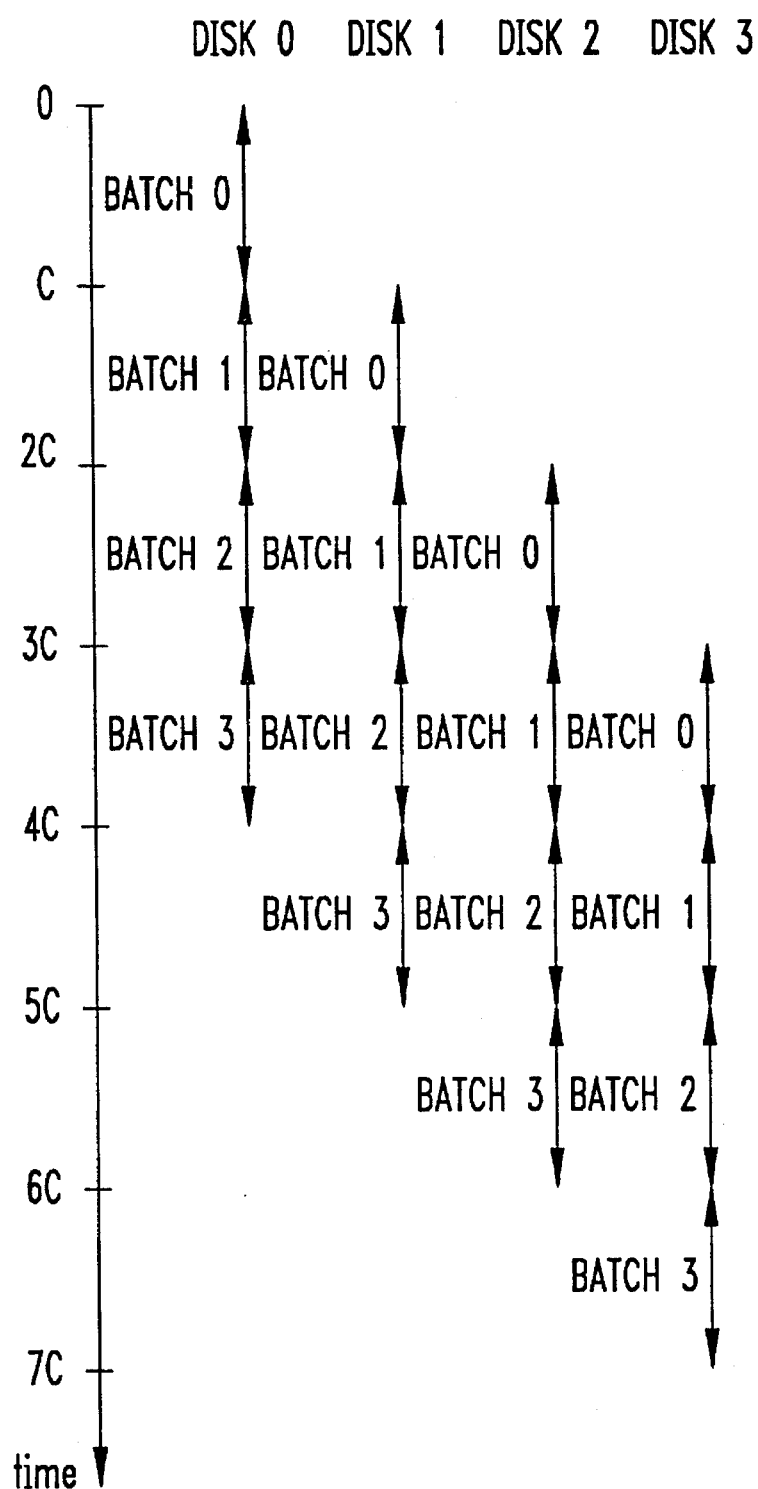
FIG. 4 is a diagram showing the scheduling of the stripes on the disks according to an aspect of the invention.

To describe the operation of the system, the streams are numbered from 0 to nd−1, the disks are numbered from 0 to d−1 and the time is divided in cycles numbered 0,1 . . . , etc. Streams 0 to n −1 are serviced from disk 0 during cycle 0, from disk 1 during cycle 1, . . . etc. Streams n to 2n−1 are serviced from disk 0 during cycle 1, from disk 1 during cycle 2, . . . , etc. In general, the group of streams in to (i+1)n−1 will be serviced by disk j during cycle k if (k mod d)=((i+j) mod d). FIG. 4 illustrates this scheduling scheme which is referred to as split schedules.

The number n of video streams that can be serviced from a given disk is a function of the transfer size U and is determined by the condition that the worst case access time should be less than the playback time. This condition is required to ensure continuous playback. For example if requests are issued in clusters of size n, then the above condition can be formulated as follows: $T_{max}(n,U)<U/R$, R being the compressed data rate; $T_{max}(n,U)$ being the worst case time for servicing n requests of size U from one disk and n=number of users serviced in a batch, e.g. 6.

A buffer pair of size 2U is allocated to each video stream. One half of the buffer pair is used by the playback process to play the video out while the other half is allocated to the outstanding I/O request. Since only one disk services a given I/O stream during a given cycle, there is one outstanding I/O per stream. This represents a significant reduction in buffer requirements over previous techniques.

The double buffering scheme and the scheduling allow for issuing concurrent requests to several disks attached to the same SCSI bus and receiving them out of order. Read caching in the disk drives serves to allow a disk arm to work on a new request while the previous request is being shipped or waiting to be shipped to the I/O board over the SCSI bus.

A new video performance may start if the number of video streams currently being served is less than nd. When a new video performance is initiated, the disk containing the starting address for the requested stream is identified. However, the first I/O request for that session cannot be initiated until the beginning of a cycle in which the disk services less than n sessions. Hence there might be up to dC time delay before an I/O request for that session is queued. Playback starts at the end of the cycle in which the first I/O has been requested. Hence, the upper bound on the playback delay is (d+1)C.

Figure 5:
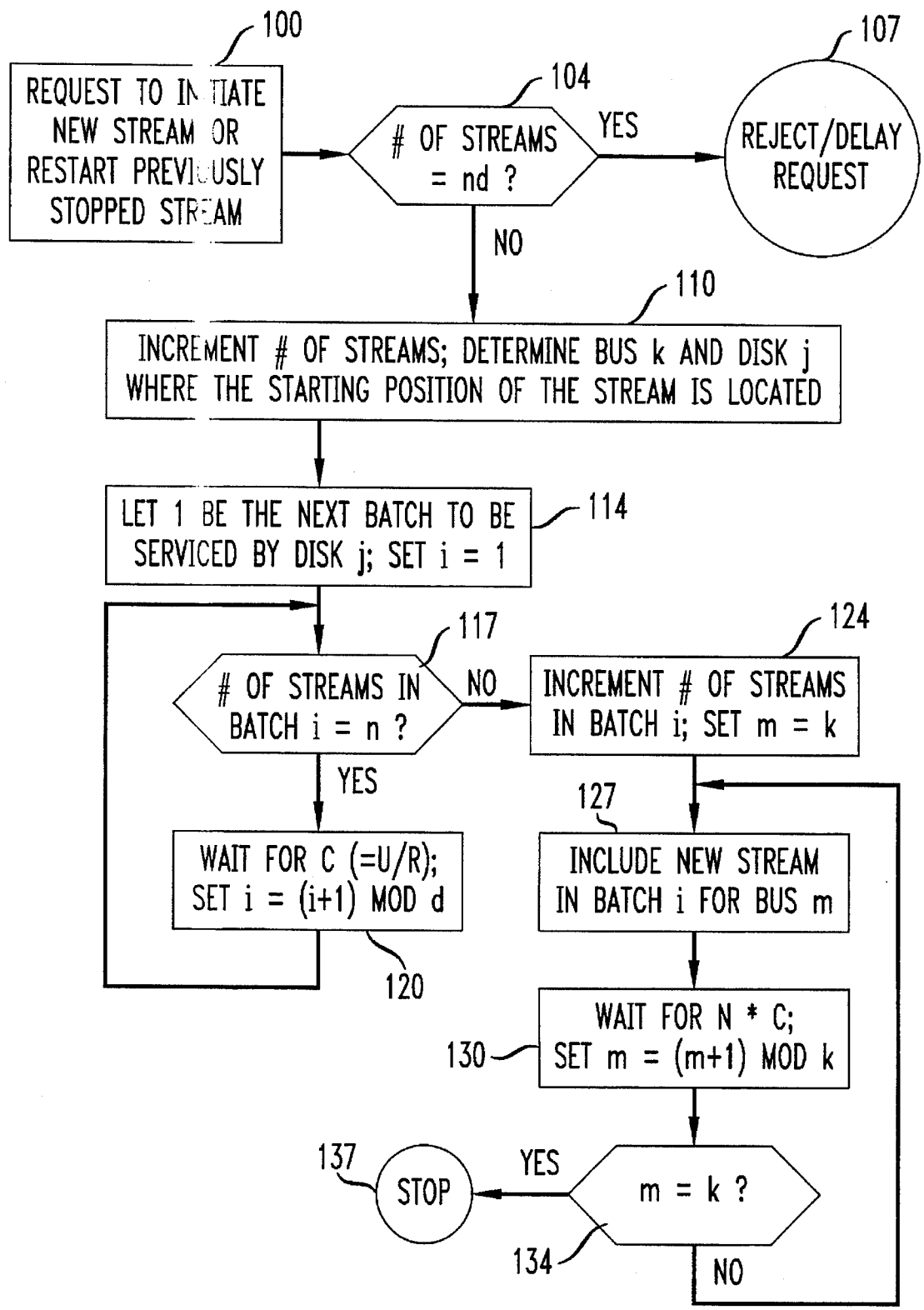
FIGS. 5 and 6 are flow charts of the operation of the system in FIG. 1.
Figure 6:
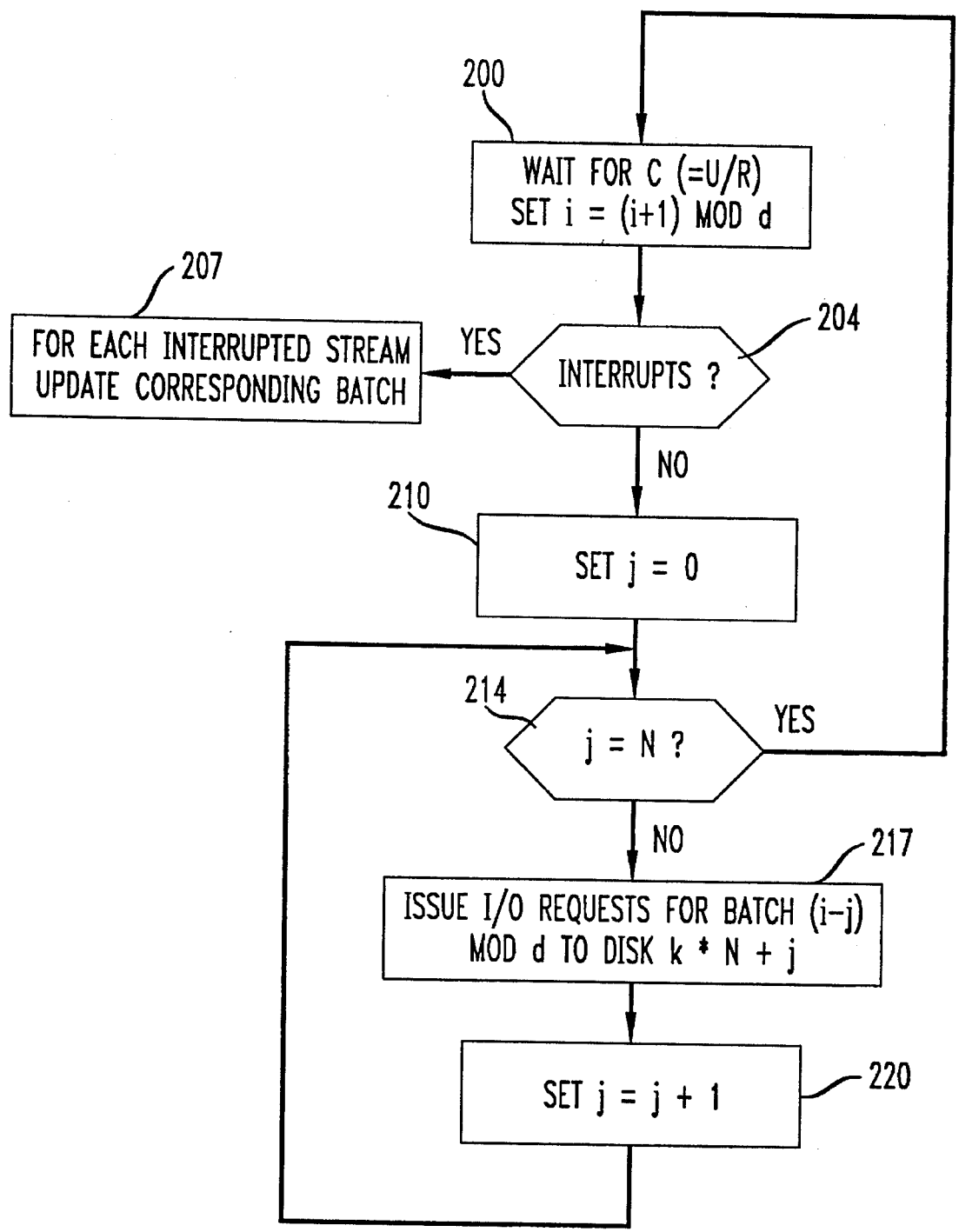

FIG. 5 is a flow chart of the process used by the host computer HC0 to set up a new stream or to restart an interrupted stream. FIG. 6 is a flow chart of the control program used by the microprocessors MI0 to MI(k−1) to schedule the I/O requests on the disks attached a bus BS0 to BS(K−1). Video streams are interrupted if the user issues a stop, pause or jump command or when the video ends.

In FIG. 5, the operation starts at step 100 with a request for a new stream or restart of a previously stopped stream. In step 104, the host computer HC0 determines if the number of streams in use is equal to nd. If yes, the request is rejected or delayed in step 107. If the answer is no, in step 110 the stream number is incremented and the host computer HC0 determines the bus k and the disk j where the starting position of the stream is located. In step 114, the host computer determines the next batch to be serviced by the disk j, and sets i=1. In step 117 the host computer HC0 determines if the number of the streams in batch i=n. If yes, the host computer HC0, in step 120, produces a wait for C(=U/R), and set i=(1+i) mod d, and return to step 117. If no, the host computer HC0 increments the number of streams in batch i and set m=k in step 124. In step 127 the host computer HC0 includes the new stream in batch i for bus and communicates the new batch content to the appropriate microprocessor m. In step 130 host computer HC0 waits for N*C and sets m=(m+1) mod K. In step 134 host computer HC0 asks if m=k. If no, the process returns to step 127. If yes, the process stops in step 137.

FIG. 6 illustrates a program for scheduling disk access requests on bus k. Here, in step 200, the microprocessor MIK waits for one cycle time C(=U/R) and sets i=(i+1)mod d to increment to the next cycle. Step 204 determines if any interruptions have occurred. If yes, in step 207, the microprocessor MIK updates the corresponding batch for each interrupted stream. If no, it goes to the first disk on the bus by setting j=0 in step 210 and, in step 214, asks whether j=N. If yes, the process returns to step 200. If not the microprocessor MIK issues I/O requests for batch (i−j) mod d to disk k*N+j in step 217, and in step 220, sets j=j+1 and returns to step 214.

Figure 7:
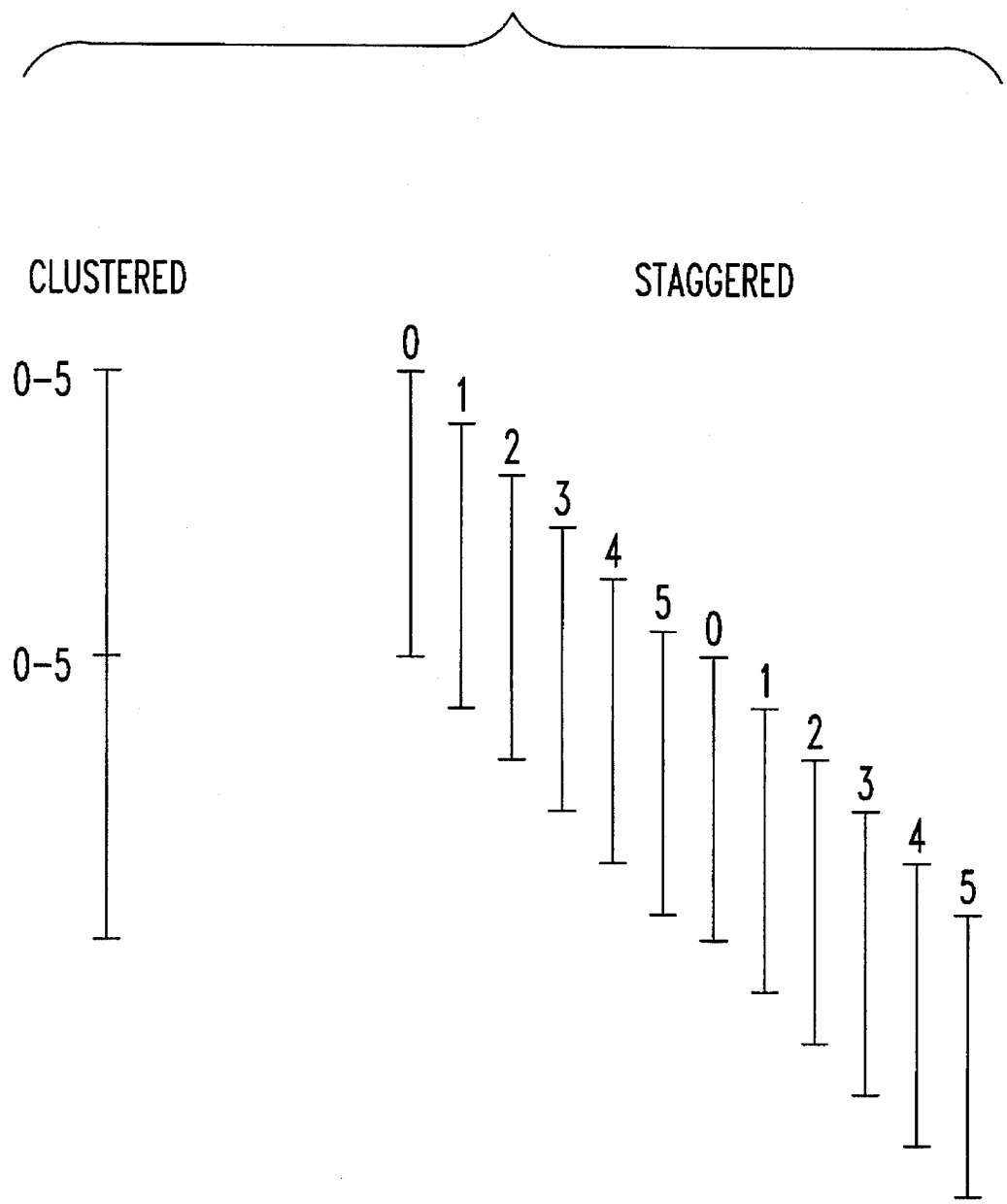
FIGS. 7 and 8 are graphs showing other scheduling of disks in FIG. 3.
Figure 8:
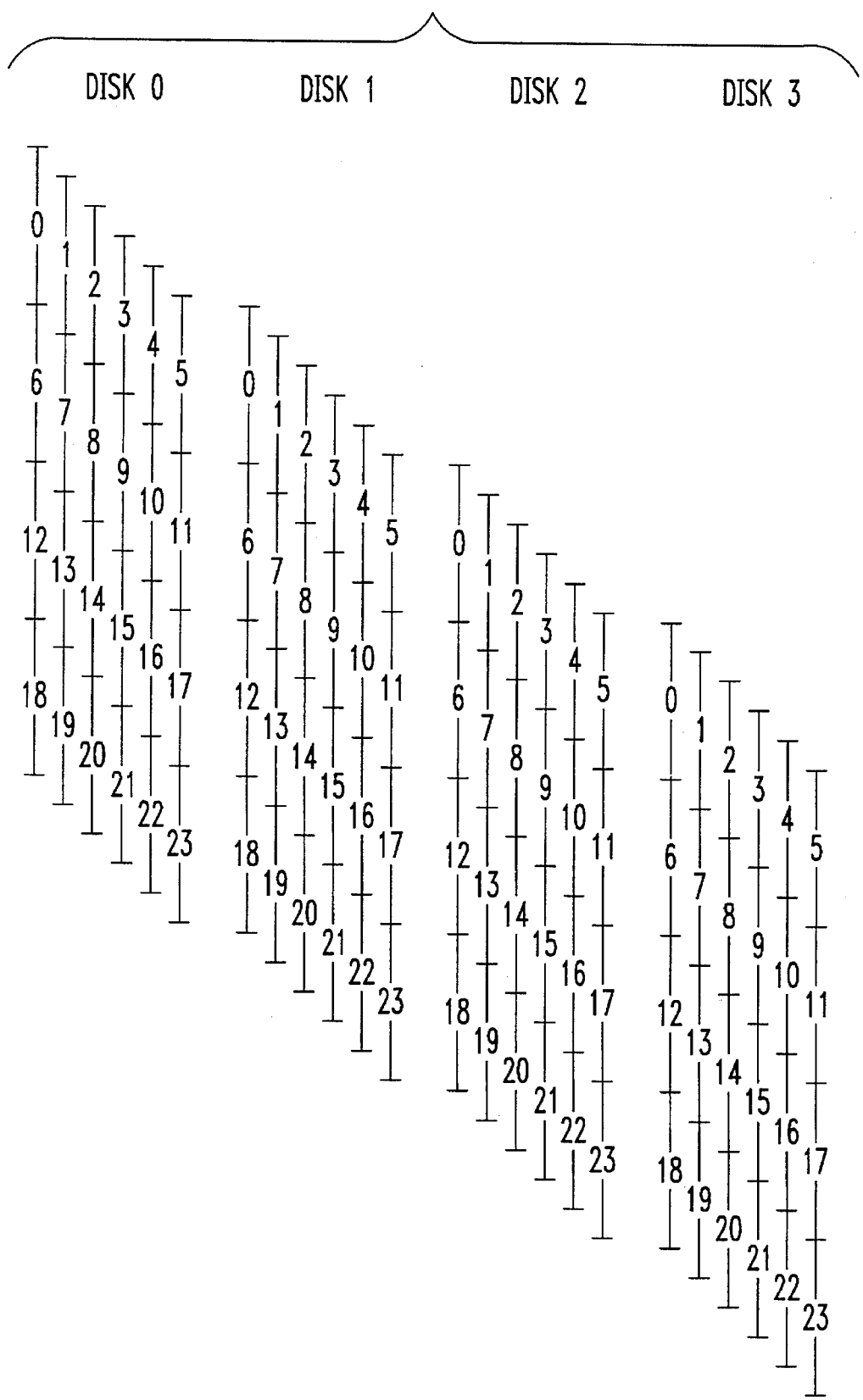

One advantage of issuing I/O requests in batches (clusters) is to minimize seek time by giving the disk firmware the opportunity to sort the requests and service them in SCAN order. However in some cases, it is beneficial to stagger the requests in order to spread the use of resources over the entire service cycle. FIG. 7 shows the difference between clustered requests and staggered requests for the case of n=6 concurrent requests. The proposed scheduling scheme for striped disks is compatible with both the clustered and staggered request issue method. FIG. 8 illustrates the way requests would be scheduled in the staggered in the case of striping over four disks assuming a disk can support six concurrent requests. Other alternatives are possible. For example, n/k requests can be issued simultaneously at the beginning of each period of length C/k.

In the above scheduling and buffer allocation schemes, the buffer is divided into frames of contiguous memory space of size U. When a frame is allocated to an I/O request, a pointer to the appropriate location in the buffer is set so that the SCSI adapter can transfer data directly into the buffer without intervention from the microprocessor. This significantly lowers the load upon the microprocessor and the memory bus in the I/O board.

The buffer size required per stream is further reduced (less than 2U per stream) by allowing the buffer space allocated to an outstanding request to be non-contiguous. This is done at the expense of additional hardware and software complexity. To accomplish the additional reduction in buffer requirements involves staggering the I/O requests as shown in FIG. 8 and reusing space progressively freed by the playback or readout process from different streams to allocate space for new I/O requests.

For each disk, a new I/O request is initiated at the beginning of each interval of length C/n. During the same amount of time (i.e., C/n), a buffer area equal to n×U/n will be freed by the playback of data from the n transfer units that were fetched from that disk and that are currently being played out. This non-contiguous buffer area of size U can be allocated to the I/O request initiated at the beginning of the following interval of length C/n. For each disk, at the beginning of a period of length C/n, n buffer areas of size U are allocated for the n outstanding I/O requests while the amount of playback data remaining from the transfer units currently in the buffer is (U/n)(1+2+ . . . +n). Hence the buffer size required for n streams is nU+(U/n)(1+2+ . . . +n) =U(n+(n+1)/2) and the buffer requirements per stream are U(1+(n+1)/(2n)).

Figure 9:
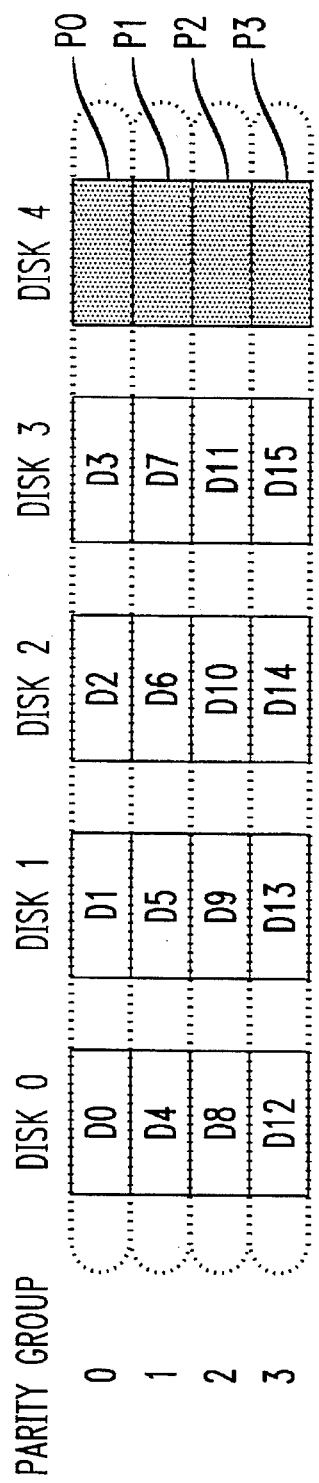
FIG. 9 is a graph showing an embodiment of data and parity layout.

According to an embodiment of the invention disk failure is dealt with by maintaining parity information across disks. The invention uses essentially two options for parity arrays, namely a hardware (redundant arrays of independent disks) RAID3 array or a software controlled RAID4 array. FIG. 9 shows the layout of data and parity in RAID3 and RAID4 arrays. FIG. 9 shows the data and parity layout in RAID3 and RAID4 arrays. The size of each data block Di and each parity block Pi is the striping unit. In RAID3, the striping unit is equal to a byte or word, the disk spindles are synchronized, and the entire parity group is read or written in any I/O access. In RAID4, the striping unit can be much larger, disks are accessed independently and spindle synchronization is not required.

With RAID3, striping is done at the byte or word level, disk spindles are synchronized and all the disks in the array are accessed together to serve a given request. This precludes using scheduling mechanisms such as the ones described earlier. The buffer size required per user is 2dU in the case of RAID3 where d is the number of data disks in the array and U is the unit of transfer from each disk. Also, typical RAID3 hardware implementations are limited to less than 10 disks per array. The benefit of using RAID3 is that the array will continue operating after a disk failure without a noticeable degradation in performance since the RAID3 controller reads the parity along with the data on every access and can reconstruct data from a failed disk on the fly without interruption of service.

In the RAID4 array of the invention, disks are accessed independently and striping can be done at a larger granularity. The striping unit is chosen to be equal to the transfer unit U fetched from each disk during a service cycle. The scheduling schemes described earlier can be implemented with the RAID4 organization and the buffer size requirements per stream can be reduced to 2U per stream. In the case of a disk failure, we reconstruct the lost data by waiting for corresponding transfer units to be read from the other drives. This requires enough buffer space to hold all the transfer units in a given parity group in order to reconstruct the data and play it back in the right order. This recovery scheme raises the buffer requirements for split schedules to (d+1)U per user.

In order to maximize the degree of concurrency to any particular video object, one embodiment of the invention involves striping video content over all the available disks in the system i.e. d=N×K.

Figure 10:
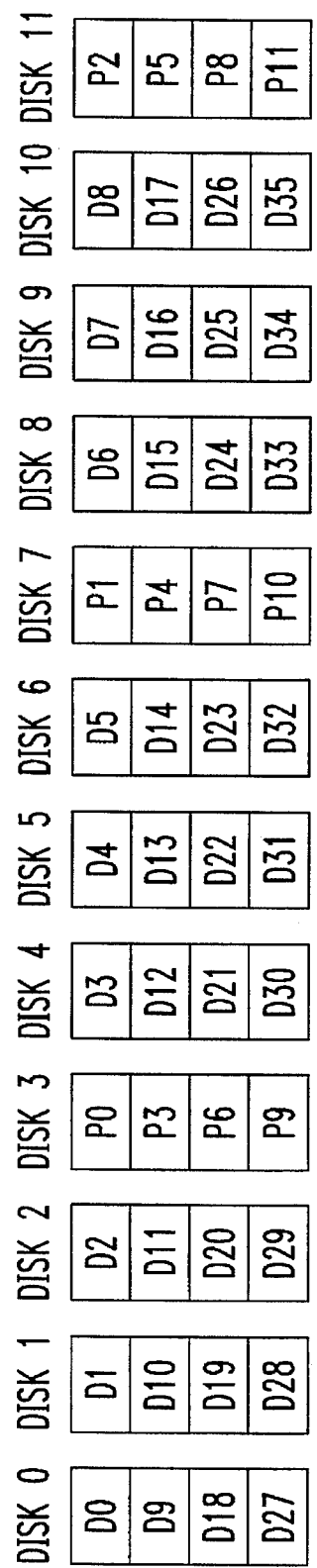
FIG. 10 is a graph showing other striping across disk arrays with parity.

When striping video content over a large number of disks (e.g., d=100), the buffer size required to achieve recovery from disk failure using the software controlled RAID4 scheme (i.e., (d+1)U per stream) grows. According to an embodiment of the invention, additional parity disks are provided to reduce the buffer requirements. If a parity disk is used for each set of data δ disks (d =mδ, for some integer m), the buffer requirements drop to (δ+1)U per stream. This approach reduces the buffer requirements at the expense of increasing the number of parity disks from 1 to m. It also provides a higher level of reliability since it can tolerate one failure within each subset of δ data disks protected by a parity disk. FIG. 10 illustrates the approach for d =9 and δ=3. Disk 3 contains the parity for disks 0,1,2; disk 7 contains the parity for disks 4,5,6; and disk 11 contains the parity for disks 8,9,10.

Figure 11:
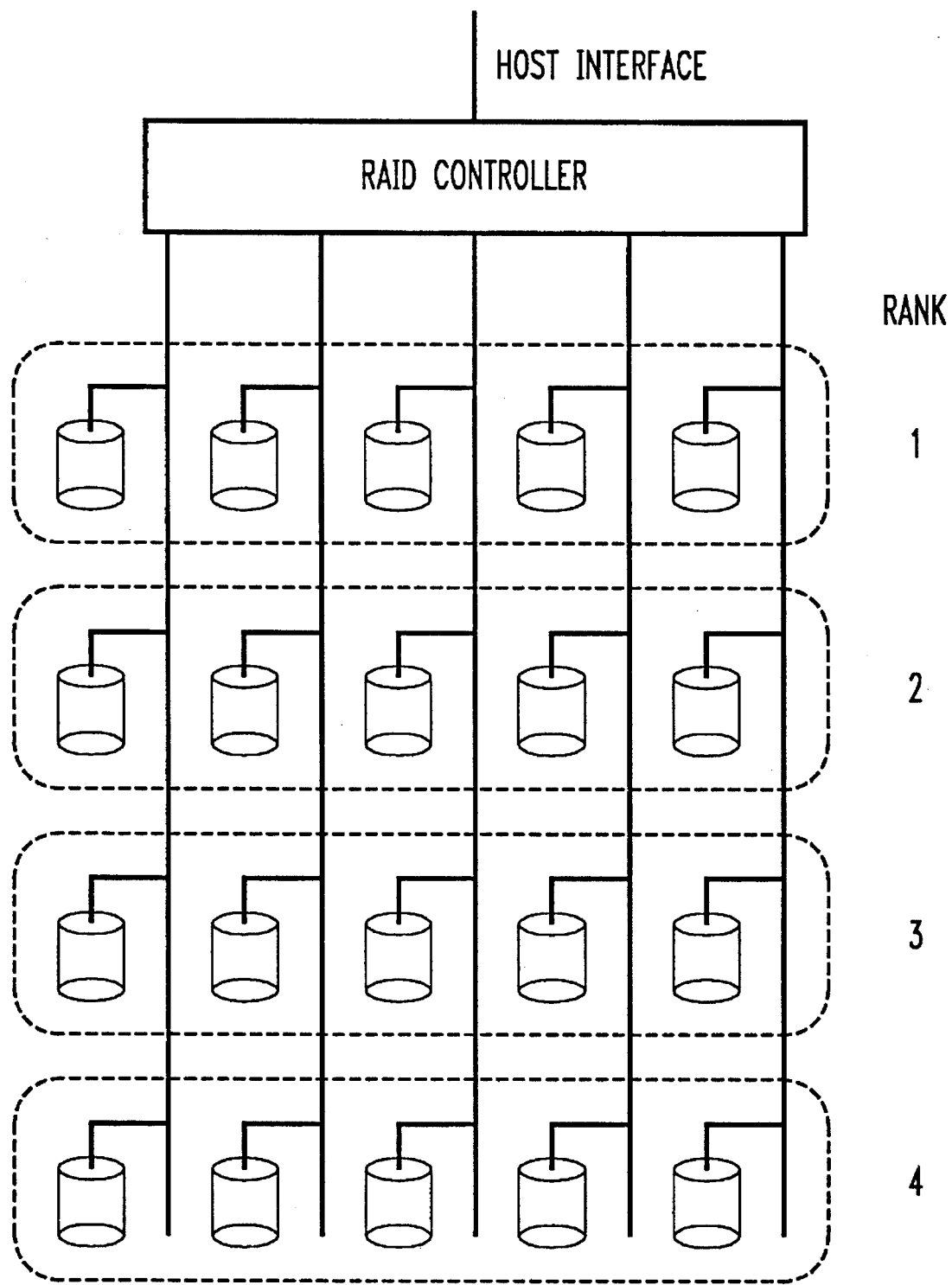
FIG. 11 is a block diagram of disk arrays with four ranks of drives attached to the same controller.

According to an embodiment of the invention, for achieving high reliability while striping over a large number of disks RAID3 arrays are used as building blocks and video content is striped over several such arrays. The buffer requirements per stream are equal to 2δU, δ being the number of data disks in the RAID3 array. One important advantage of such a scheme is that parity computations needed for recovering data in the event of a failure are done in hardware by the RAID controller instead of having to perform them in software in the microprocessor in a pure software controlled scheme. Some commercial disk arrays provide multiple ranks of RAID3 arrays attached to the same controller. The controller stripes data across drives within a given rank in such a way that each rank looks like a large logical disk. FIG. 11 illustrates such arrays. Four ranks are shown in the figure. Each rank is configured as a 4+1 RAID3 array. Such arrays could be used to implement the strategy described here. Striping across ranks or across RAID3 controllers is managed by the I/O board software and the host software while the RAID controller performs striping within each rank and provides recovery from disk failures.

The invention involves laying-out video content over multiple disks and an associated scheduling policy for accesses to the video content that minimizes buffer requirements. Spreading video content over multiple disks allows more users to view a single copy of a video object (e.g., movie) and thus minimizes disk storage requirements. The same playback rate is assumed for all users. Video content is divided into blocks of fixed size. Consecutive blocks are stored on different disks in round-robin order. One block is read from disk in each cycle for every user. The disk accesses are scheduled in the following fashion. Sessions are divided into as many groups as there are disks in the striped subsystem. During a given cycle, a different group is serviced from each disk. A given group is serviced by a different disk in every cycle in the same round-robin order used to store the video content.

Because the number of data blocks may be in the thousands, such as 10,000, a 3 hour video performance may be divided into blocks of $3 \times 60 \times 60 \times 10^{-4}$ or 1.08 seconds.

The invention makes sure that the number of concurrent requests to a disk is always controlled to permit timely response from the disk. It makes sure to meet the real time deadline to supply data to each stream.

The invention increases the efficiency of disc access by issuing requests at the same time so that the disc firmware can reduce disk arm movement between data transfers.

The invention makes sure the bus will be available to transfer data into the buffer. It allows one to concurrently access more than one video stream from one or more discs on one bus. This is accomplished by the use of double buffering and the use of a transfer size and a corresponding cycle time long enough to accommodate possible delays due to bus contention. This allows for sufficient time between the moment a request is issued and the moment the data is to be read out from the buffers so that bus contention delays do not affect continuous playback.

While embodiments of the invention have been described in detail, it will be evident to those skilled in the art that the invention may be embodied otherwise without departing from its spirit and scope.

What is claimed is:

1. A method of video playback of video content distributed on a plurality of disks in a plurality of data blocks for a plurality of viewers, said method comprising:

within a time cycle, accessing data for each viewer from different ones of the blocks on the disks;

placing the accessed data from each block in respective buffers; and reading out the data in the buffers sequentially;

the step of accessing including accessing the video data for each viewer from successive blocks within a video stream distributed over different disks; and the step of placing the accessed data including placing only a single block of a video data stream in each buffer so that each viewer obtains data from a single buffer in a video data stream at any one time.

2. A method as in claim 1, wherein the video stream is in successive blocks on a round robin basis, and the accessing step includes accessing a different block on the same disk within the time cycle.

3. A method as in claim 1, wherein the plurality of of blocks exceeds 1000.

4. A method as in claim 1, wherein each buffer includes a plurality of double buffer arrays and data is stored in one half of each double buffer in said arrays while data is read out of the other half of the double buffers in said arrays.

5. A method as in claim 4, the plurality of successive cycles form a plurality of video data streams, one stream for each user, and each stream uses only one buffer pair at any given time.

6. A method as in claim 1, wherein the cycles are read out sequentially.

7. A method as in claim 1, wherein the cycles are read out in staggered groups.

8. A method as in claim 1, further comprising performing recovery from disk failure using parity information stored on disk using a (redundant arrays of independent disks) RAID4 array.

9. A method as in claim 1, further comprising performing recovery from disk failure using parity information stored on disk using a hardware (redundant arrays of independent disks) RAID3 array.

10. A video apparatus, comprising:

a plurality of disks having video content distributed on the disks in successive plurality of data blocks;

a data accessing arrangement coupled to the disks;

a plurality of respective buffers coupled to the disks for holding the data from said blocks; and a buffer read-out arrangement;

said video content being distributed for a plurality of viewers among the blocks arranged in video streams along a plurality of the disks;

each of said buffers being arranged for receiving data from a single one of the video streams.

11. An apparatus as in claim 10, wherein the content in successive blocks appears on the disks on a round robin basis, and the accessing means includes accessing a different block on the same disk within the time cycle.

12. An apparatus as in claim 10, wherein the plurality of blocks exceeds 1000.

13. An apparatus as in claim 10, wherein each buffer includes a plurality of double buffers having respective halves, and means for storing data in each half while data is being read out of the other half of each double buffer.

14. An apparatus as in claim 13, wherein said read-out arrangement sequentially produces a plurality of video streams, one stream for each user, and each stream uses only one buffer pair at any given time.

15. An apparatus as in claim 10, wherein said read out arrangement includes means for reading out cycles sequentially.

16. An apparatus as in claim 10, wherein said read-out arrangement includes means for reading out cycles in staggered groups.

17. An apparatus as in claim 10, further comprising means for performing recovery from disk failure using parity information stored on disk using a (redundant arrays of independent disks) RAID4 array.

18. An apparatus as in claim 10, further comprising means for performing recovery from disk failure using parity information stored on disk using a hardware (redundant arrays of independent disks) RAID3 array.

* * * * *